US007775089B2

(12) United States Patent
Suzuki et al.

(10) Patent No.: US 7,775,089 B2
(45) Date of Patent: Aug. 17, 2010

(54) ABNORMALITY DETECTION APPARATUS AND ABNORMALITY DETECTION METHOD FOR INTERNAL COMBUSTION ENGINE

(75) Inventors: Takashi Suzuki, Gotenba (JP); Takanobu Kawano, Oobu (JP)

(73) Assignees: Toyota Jidosha Kabushiki Kaisha, Toyota-shi (JP); Nippon Soken, Inc., Nishio-shi (JP)

( * ) Notice: Subject to any disclaimer, the term of this patent is extended or adjusted under 35 U.S.C. 154(b) by 231 days.

(21) Appl. No.: 12/219,483

(22) Filed: Jul. 23, 2008

(65) Prior Publication Data

US 2009/0025467 A1 Jan. 29, 2009

(30) Foreign Application Priority Data

Jul. 25, 2007 (JP) ............................ 2007-193590

(51) Int. Cl.
*G01M 15/04* (2006.01)

(52) U.S. Cl. .................................................. 73/114.15

(58) Field of Classification Search .............. 73/114.02, 73/114.04, 114.13, 114.15
See application file for complete search history.

(56) References Cited

U.S. PATENT DOCUMENTS

| | | | | |
|---|---|---|---|---|
| 6,742,487 | B2 * | 6/2004 | Yamaguchi et al. | 123/179.3 |
| 6,962,224 | B2 * | 11/2005 | Nakanowatari | 180/65.225 |
| 7,503,207 | B2 * | 3/2009 | Nishigaki et al. | 73/114.02 |
| 7,503,208 | B2 * | 3/2009 | Akimoto et al. | 73/114.03 |
| 7,543,483 | B2 * | 6/2009 | Akimoto et al. | 73/114.03 |
| 7,631,710 | B2 * | 12/2009 | Utsumi | 180/65.21 |
| 7,665,558 | B2 * | 2/2010 | Akimoto et al. | 180/65.28 |
| 7,707,874 | B2 * | 5/2010 | Suzuki | 73/114.04 |
| 2003/0173123 | A1 * | 9/2003 | Nakanowatari | 180/65.2 |
| 2007/0101806 | A1 * | 5/2007 | Yamaguchi | 73/117.3 |
| 2009/0151469 | A1 * | 6/2009 | Suzuki | 73/847 |
| 2009/0308145 | A1 * | 12/2009 | Suzuki | 73/114.04 |

FOREIGN PATENT DOCUMENTS

| | | | |
|---|---|---|---|
| JP | 2049955 | A | 2/1990 |
| JP | 6257480 | A | 9/1994 |
| JP | 2005-343458 | A | 12/2005 |
| JP | 2007-30710 | A | 2/2007 |

* cited by examiner

*Primary Examiner*—Lisa M Caputo
*Assistant Examiner*—Freddie Kirkland, III
(74) *Attorney, Agent, or Firm*—Kenyon & Kenyon LLP

(57) ABSTRACT

A crankshaft of an engine is connected to a carrier shaft of a planetary gear via a damper. The damper includes a torsion member generating elastic force for suppressing relative rotation, when the crankshaft and the carrier shaft are relatively rotated. A control unit estimates engine torque with using rotation angular acceleration of the crankshaft calculated from a detected value of an engine speed sensor, and corrects the estimated engine torque with a correction term of the elastic force of the damper calculated based on a damper torsional angle. Then, the control unit diagnoses an abnormality of the engine based on the estimated engine torque after correction.

10 Claims, 9 Drawing Sheets

ENGINE
150
159
156
164
161
160
157
127
162
158
135
132
134
133
MG1
139
128
125
121
122
120
123
124
126
149
112
111
129
MG2
143
144
119
145
142
W
V
U
W
V
U

MISFIRE
HALF-MISFIRE
REAL TORQUE [Nm]
(CALCULATED FROM IN-CYLINDER PRESSURE)
200
0
DAMPER TORSIONAL ANGLE [deg]
10
8
6
4
2
0
ESTIMATED TORQUE
(180° CA AVERAGE) [Nm]
80
40
0
(REAL TORQUE)
DAMPER TORSIONAL TORQUE NOT CORRECTED
DAMPER TORSIONAL TORQUE CORRECTED
0
0.1
0.2
0.3
0.4
0.5
0.6
Time [sec]

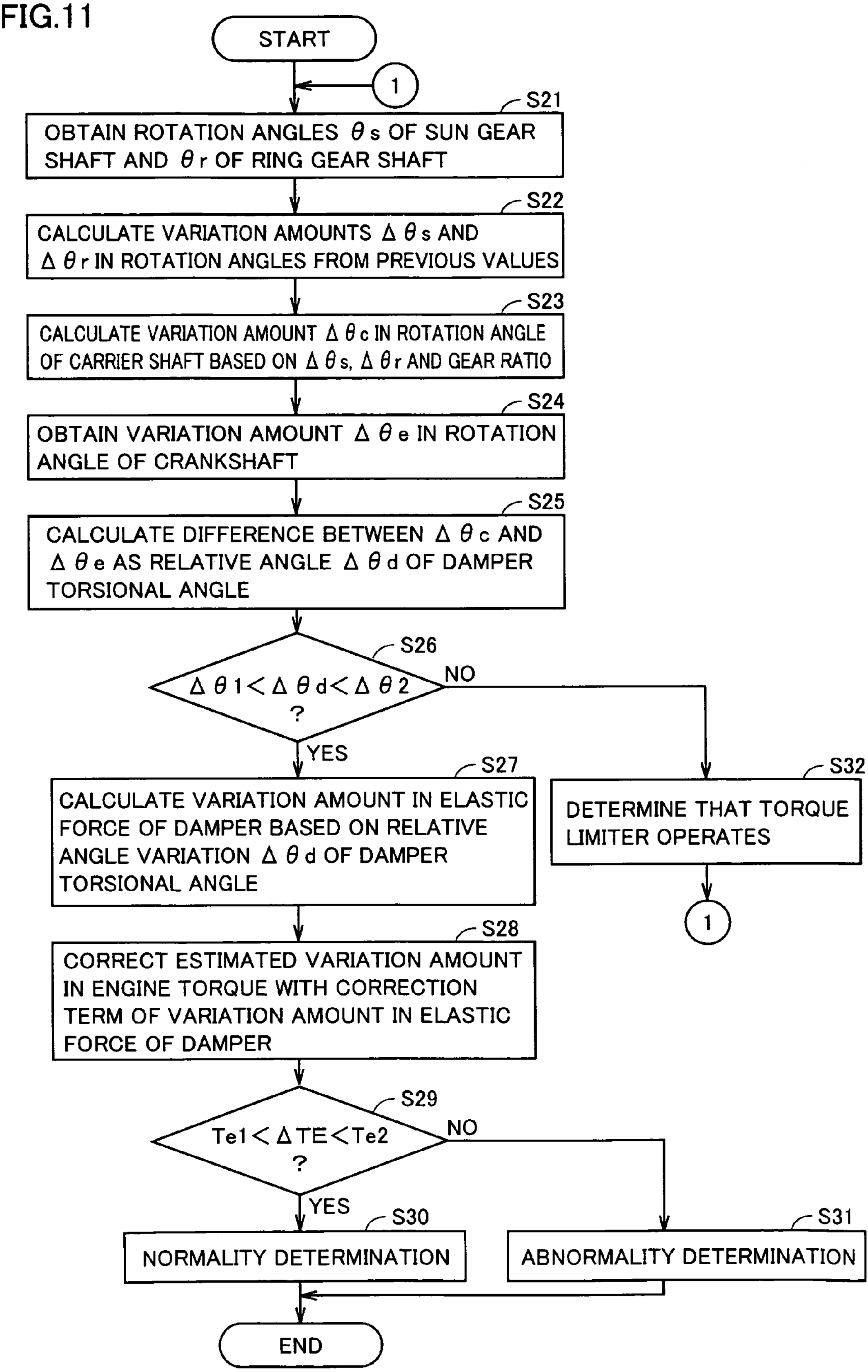
FIG.11
START
1
S21
OBTAIN ROTATION ANGLES θs OF SUN GEAR SHAFT AND θr OF RING GEAR SHAFT
S22
CALCULATE VARIATION AMOUNTS Δθs AND Δθr IN ROTATION ANGLES FROM PREVIOUS VALUES
S23
CALCULATE VARIATION AMOUNT Δθc IN ROTATION ANGLE OF CARRIER SHAFT BASED ON Δθs, Δθr AND GEAR RATIO
S24
OBTAIN VARIATION AMOUNT Δθe IN ROTATION ANGLE OF CRANKSHAFT
S25
CALCULATE DIFFERENCE BETWEEN Δθc AND Δθe AS RELATIVE ANGLE Δθd OF DAMPER TORSIONAL ANGLE
S26
Δθ1<Δθd<Δθ2 ?
NO
YES
S27
CALCULATE VARIATION AMOUNT IN ELASTIC FORCE OF DAMPER BASED ON RELATIVE ANGLE VARIATION Δθd OF DAMPER TORSIONAL ANGLE
S32
DETERMINE THAT TORQUE LIMITER OPERATES
1
S28
CORRECT ESTIMATED VARIATION AMOUNT IN ENGINE TORQUE WITH CORRECTION TERM OF VARIATION AMOUNT IN ELASTIC FORCE OF DAMPER
S29
Te1<ΔTE<Te2 ?
NO
YES
S30
NORMALITY DETERMINATION
S31
ABNORMALITY DETERMINATION
END

ABNORMALITY DETECTION APPARATUS AND ABNORMALITY DETECTION METHOD FOR INTERNAL COMBUSTION ENGINE

This nonprovisional application is based on Japanese Patent Application No. 2007-193590 filed on Jul. 25, 2007, with the Japan Patent Office, the entire contents of which are hereby incorporated by reference.

BACKGROUND OF THE INVENTION

1. Field of the Invention

The present invention relates to an abnormality detection apparatus and an abnormality detection method for an internal combustion engine, and particularly relates to an abnormality detection apparatus and an abnormality detection method for an internal combustion engine to be applied to a motive power output apparatus provided with a plurality of power sources including the internal combustion engine.

2. Description of the Background Art

Conventionally, as an abnormality detection apparatus for an internal combustion engine that detects an abnormal cylinder where explosive combustion is not performed due to clogging or failure of a fuel injection valve, for example, Japanese Patent Laying-Open No. 02-49955 discloses a cylinder abnormality detection apparatus for an internal combustion engine that detects rotation angular speed of a crankshaft serving as an output shaft of the internal combustion engine by synchronizing with a combustion process of each cylinder, and detecting an abnormal cylinder causing irregular misfire based on a deviation between the detected rotation angular speed and a reference value of the angular speed.

According to the above, when a difference between rotation speed of a targeted cylinder and rotation speed of the previous cylinder serving as the reference value is larger than a predetermined value, the cylinder abnormality detection apparatus for the internal combustion engine sets a reference value for determining the next rotation speed to a value larger than the rotation speed by the predetermined value. Therefore, while an abnormality is caused in any cylinder and even in a case where accidental misfire is caused in a cylinder where an explosion process is performed immediately before the cylinder, it is possible to precisely determine that the cylinder where an abnormal state is intermittently caused has the abnormality.

However, in a case where the cylinder abnormality detection apparatus disclosed in Japanese Patent Laying-Open No. 02-49955 is applied to a hybrid vehicle of a mechanically split type, there is a problem that the abnormality of the internal combustion engine cannot be precisely detected due to the following reason.

In a hybrid vehicle provided with an internal combustion engine and a motor generator as power sources, a crankshaft of the internal combustion engine, a rotation shaft of the motor generator and a drive shaft may be mechanically connected via a planetary gear. It should be noted that the planetary gear has a property where, when rotation speed and torque (hereinafter, both are collectively called as a rotation state) of two out of the three rotation shafts mentioned above are determined, a rotation state of the remaining rotation shaft is inevitably determined.

In a hybrid vehicle having such a configuration, motive power output from the internal combustion engine is split into motive power to be mechanically transmitted to the drive shaft and motive power to be regenerated as electric power. Further, by running the motor generator with using the regenerated electric power, the vehicle can travel while outputting desired motive power. Since the motive power of the motor generator can be output from the drive shaft, the vehicle can also travel with only using the motive power output from the motor generator.

That is, in the hybrid vehicle, the crankshaft of the internal combustion engine and the rotation shaft of the motor generator are connected so as to be rotated at relative but different rotation speed from each other. Therefore, the rotation state of the motor generator largely influences the rotation angular speed of the crankshaft of the internal combustion engine.

However, the conventional cylinder abnormality detection apparatus for detecting the abnormal cylinder based on the rotation angular speed of the crankshaft is to be applied to the motive power output apparatus having only the engine as the power source, and hence such an influence of the motor generator over the rotation state of the crankshaft is not taken into consideration. As a result, the internal combustion engine does not easily estimate torque actually generated in accordance with a combustion state thereof with high accuracy. Therefore, there is a problem that the abnormal cylinder of the internal combustion engine cannot be precisely detected.

SUMMARY OF THE INVENTION

An object of the present invention is to provide an abnormality detection apparatus and an abnormality detection method for an internal combustion engine capable of precisely detecting an abnormal cylinder of the internal combustion engine where an output shaft is mechanically connected to a rotation shaft of a motor generator.

According to the present invention, an abnormality detection apparatus detects an abnormality of the internal combustion engine in a motive power output apparatus for outputting motive power to a drive shaft by utilizing the internal combustion engine and a motor generator as power sources. The motive power output apparatus includes a power split device configured to mechanically connect an input shaft receiving the motive power from the internal combustion engine, a rotation shaft of the motor generator and the drive shaft, and also to mechanically split the motive power from the internal combustion engine to the motor generator and the drive shaft, and a damper connected between an output shaft of the internal combustion engine and the input shaft for transferring the motive power while suppressing relative rotation of the output shaft of the internal combustion engine and the input shaft. The abnormality detection apparatus contains a torque estimating unit estimating output torque of the internal combustion engine based on rotation angular acceleration of the output shaft of the internal combustion engine, a torque correcting unit calculating elastic force to be imposed on the output shaft of the internal combustion engine so that the damper suppresses the relative rotation of the output shaft of the internal combustion engine and the input shaft, and to correct the estimated output torque of the internal combustion engine based on the calculated elastic force of the damper, and an abnormality diagnosing unit diagnosing the abnormality of the internal combustion engine based on the corrected output torque of the internal combustion engine.

Moreover, according to the present invention, an abnormality detection method includes the steps of estimating output torque of the internal combustion engine based on rotation angular acceleration of the output shaft of the internal combustion engine, calculating elastic force to be imposed on the output shaft of the internal combustion engine so that the damper suppresses the relative rotation of the output shaft of the internal combustion engine and the input shaft, and correcting the estimated output torque of the internal combustion engine based on the calculated elastic force of the damper, and diagnosing the abnormality of the internal combustion engine based on the corrected output torque of the internal combustion engine.

According to the abnormality detection apparatus and the abnormality detection method mentioned above, even in a case where a rotation state of the output shaft of the internal combustion engine is varied due to an influence of a rotation state of the motor generator, by taking the influence of the motor generator as the elastic force generated in the damper, this can be eliminated from the rotation state of the output shaft of the internal combustion engine. As a result, since the torque generated in the internal combustion engine in accordance with a real combustion state can be estimated with high accuracy, it is possible to precisely detect the abnormality of the internal combustion engine.

Preferably, the damper includes an elastic member compressed when the output shaft of the internal combustion engine and the input shaft are relatively rotated so as to impose the elastic force on both the shafts. The torque correcting unit includes a torsional angle obtaining unit obtaining a torsional angle of the output shaft of the internal combustion engine and the input shaft, and an elastic force calculating unit calculating the elastic force of the damper by multiplying the obtained torsional angle by an elastic constant of the elastic member.

Preferably, the damper includes an elastic member compressed when the output shaft of the internal combustion engine and the input shaft are relatively rotated so as to impose the elastic force on both the shafts. The step of correcting the output torque includes the steps of obtaining a torsional angle of the output shaft of the internal combustion engine and the input shaft, and calculating the elastic force of the damper by multiplying the obtained variation amount of the torsional angle by an elastic constant of the elastic member.

According to the abnormality detection apparatus and the abnormality detection method mentioned above, the influence of the rotation state of the motor generator can be accurately estimated by taking the influence as the elastic force generated in the elastic member included in the damper. As a result, it is possible to estimate the torque generated by the internal combustion engine in accordance with the combustion state with high accuracy.

Preferably, the power split device includes a planetary gear which has at least three gear elements, coupled with the rotation shaft of the motor generator, the drive shaft and the input shaft respectively. The torsional angle obtaining unit includes an input shaft rotation angle calculating unit calculating a rotation angle of the input shaft based on rotation angles of the rotation shaft of the motor generator and the drive shaft and a gear ratio of the gear elements, an output shaft rotation angle detecting unit detecting a rotation angle of the output shaft of the internal combustion engine, and a torsional angle calculating unit calculating a difference between the detected rotation angle of the output shaft and the rotation angle of the input shaft as the torsional angle of the output shaft of the internal combustion engine and the input shaft.

Preferably, the step of obtaining the torsional angle includes the steps of calculating a rotation angle of the input shaft based on rotation angles of the rotation shaft of the motor generator and the drive shaft and a gear ratio of the gear elements, detecting a rotation angle of the output shaft of the internal combustion engine, and calculating a difference between the detected rotation angle of the output shaft and the rotation angle of the input shaft as the torsional angle of the output shaft of the internal combustion engine and the input shaft.

According to the abnormality detection apparatus and the abnormality detection method mentioned above, by using an action collinear line established between the rotation shaft of the motor generator, the drive shaft and the input shaft, the rotation angle of the input shaft can be obtained. As a result, it is possible to easily and precisely estimate an influence of the rotation state of the input shaft over the output shaft of the internal combustion engine.

Preferably, the torsional angle obtaining unit further includes a zero point correcting unit correcting the calculated difference between the rotation angle of the output shaft and the rotation angle of the input shaft by taking the torsional angle of the output shaft of the internal combustion engine and the input shaft in an operation state that the output torque of the internal combustion engine is substantially zero as a zero point.

Preferably, the step of obtaining the torsional angle further includes the step of correcting the calculated difference between the rotation angle of the output shaft and the rotation angle of the input shaft by taking the torsional angle of the output shaft of the internal combustion engine and the input shaft in an operation state that the output torque of the internal combustion engine is substantially zero as a zero point.

According to the abnormality detection apparatus and the abnormality detection method mentioned above, even in a case where there is a distinction in a relative angle of both the shafts due to an operation of a torque limiter included in the damper, by correcting the relative angle by taking the relative angle in an unloaded operation state as a zero point, it is possible to easily and precisely estimate the influence of the rotation state of the input shaft over the output shaft of the internal combustion engine.

Preferably, the power split device includes a planetary gear which has at least three gear elements, coupled with the rotation shaft of the motor generator, the drive shaft and the input shaft respectively. The torsional angle obtaining unit includes a rotation angle variation amount calculating unit obtaining the rotation angles of the rotation shaft of the motor generator and the drive shaft on a predetermined sampling cycle and calculating variation amounts in the rotation angles of the rotation shaft of the motor generator and the drive shaft in an interval between samplings, an input shaft rotation angle variation amount calculating unit calculating a variation amount in the rotation angle of the input shaft in the interval between samplings based on the variation amounts in the rotation angles of the rotation shaft of the motor generator and the drive shaft and a gear ratio of the gear elements, an output shaft rotation angle variation amount calculating unit calculating a variation amount in the rotation angle of the output shaft of the internal combustion engine in the interval between samplings, and a torsional angle variation amount calculating unit calculating a difference between the calculated variation amount in the rotation angle of the output shaft and the variation amount in the rotation angle of the input shaft as a variation amount in the torsional angle of the output shaft of the internal combustion engine and the input shaft. The elastic force calculating unit calculates a variation amount in the elastic force of the damper by multiplying the obtained torsional angle by an elastic constant of the elastic member. The torque correcting unit corrects the variation amount in the output torque of the internal combustion engine in the interval between samplings based on the calculated variation amount in the elastic force of the damper. The abnormality diagnosing unit diagnoses the abnormality of the internal combustion engine based on the corrected variation amount in the output torque of the internal combustion engine.

Preferably, the step of obtaining the torsional angle includes the steps of obtaining the rotation angles of the rotation shaft of the motor generator and the drive shaft on a predetermined sampling cycle and calculating variation amounts in the rotation angles of the rotation shaft of the motor generator and the drive shaft in an interval between samplings, calculating a variation amount in the rotation angle of the input shaft based on the variation amounts in the rotation angles of the rotation shaft of the motor generator and the drive shaft and a gear ratio of the gear elements, calculating a variation amount in the rotation angle of the output shaft of the internal combustion engine in the interval between samplings, and calculating a difference between the calculated variation amount in the rotation angle of the output shaft and the variation amount in the rotation angle of the input shaft as a variation amount in the torsional angle of the output shaft of the internal combustion engine and the input shaft. The step of calculating the elastic force is to calculate a variation amount in the elastic force of the damper by multiplying the obtained variation amount of the torsional angle by an elastic constant of the elastic member. The step of correcting the output torque is to correct the variation amount in the output torque of the internal combustion engine in the interval between samplings based on the calculated variation amount in the elastic force of the damper. The step of detecting the abnormality is to diagnose the abnormality of the internal combustion engine based on the corrected variation amount in the output torque of the internal combustion engine.

According to the abnormality detection apparatus and the abnormality detection method mentioned above, by using the action collinear line established between the rotation shaft of the motor generator, the drive shaft and the input shaft, the variation amount in the rotation angle of the input shaft can be obtained. As a result, it is possible to easily and precisely estimate the influence of the rotation state of the input shaft over the output shaft of the internal combustion engine.

According to the present invention, the torque generated by the internal combustion engine where the output shaft is mechanically connected to the rotation shaft of the motor generator in accordance with the combustion state can be estimated with high accuracy. As a result, it is possible to precisely detect an abnormal cylinder of the internal combustion engine based on the estimated torque.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart for describing an operation of detecting the abnormality of the engine according to a modified example of the embodiment of the present invention.

DESCRIPTION OF THE PREFERRED EMBODIMENTS

Figure 1:
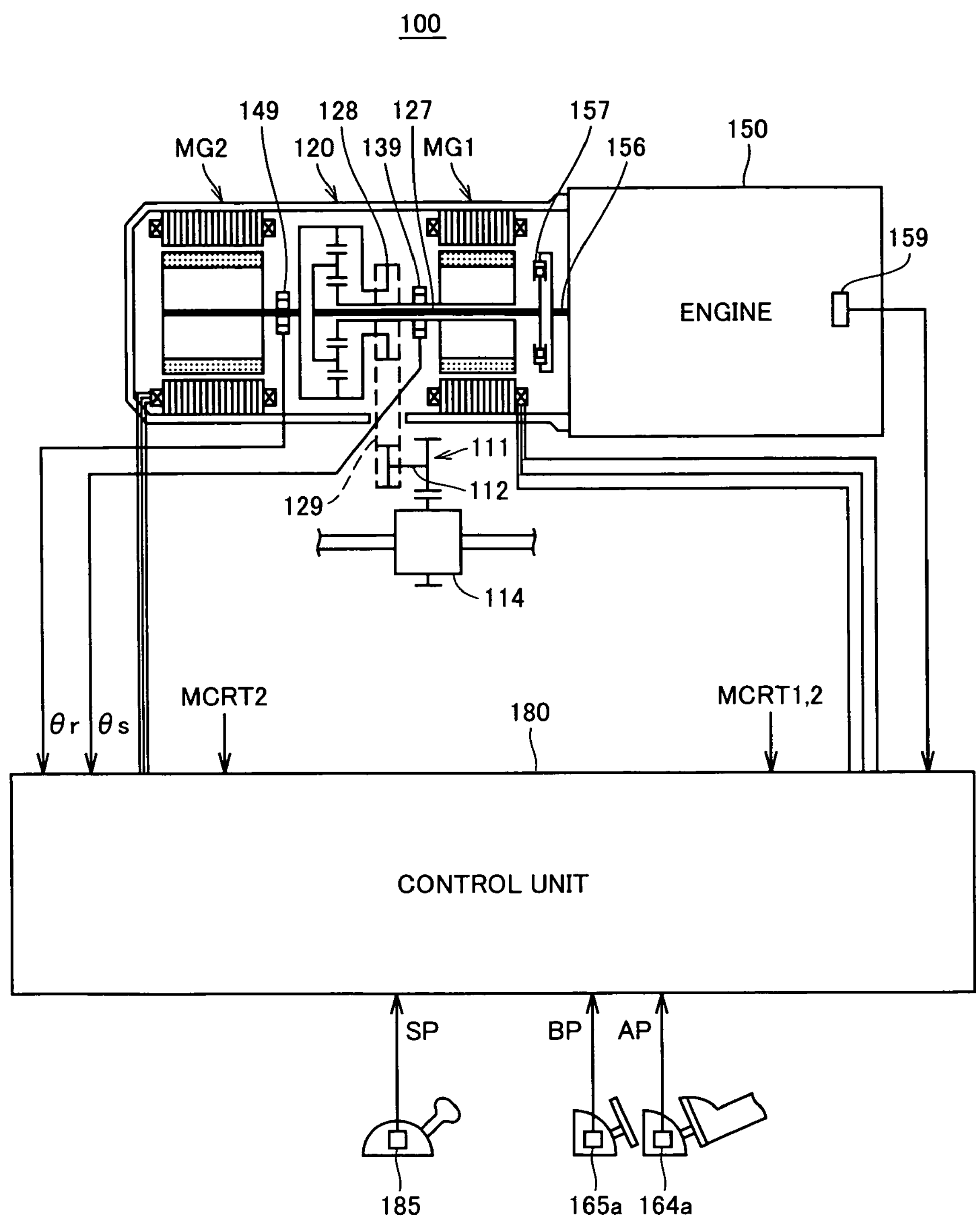
FIG. 1 is a schematic block diagram of a motive power output apparatus of a hybrid vehicle to be applied to an abnormality detection apparatus for an internal combustion engine according to an embodiment of the present invention.

Hereinafter, an embodiment of the present invention will be described in detail with reference to the drawings. It should be noted that the same reference numerals in the drawings indicate the same parts or corresponding parts.

(Configuration of Motive Power Output Apparatus of Hybrid Vehicle)

FIG. 1 is a schematic block diagram of a motive power output apparatus of a hybrid vehicle to be applied to an abnormality detection apparatus for an internal combustion engine according to the embodiment of the present invention.

With reference to FIG. 1, a motive power output apparatus 100 is provided with a motive power transmission gear 111, a drive shaft 112, a differential gear 114, motor generators MG1 and MG2, a planetary gear 120, a motive power take-off gear 128, a chain belt 129, an engine (internal combustion engine) 150, resolvers 139 and 149, a damper 157 and a control unit 180.

A crankshaft 156 of engine 150 is combined to planetary gear 120 and motor generators MG1 and MG2 via damper 157. Damper 157 suppresses the amplitude of torsional oscillation in crankshaft 156 of engine 150 and combines crankshaft 156 to planetary gear 120.

Motive power take-off gear 128 is combined to motive power transmission gear 111 via chain belt 129. Motive power take-off gear 128 receives motive power from a ring gear (not shown) of planetary gear 120, and transmits the received motive power to motive power transmission gear 111 via chain belt 129. Motive power transmission gear 111 transmits the motive power to a drive wheel via drive shaft 112 and differential gear 114.

Figure 2:
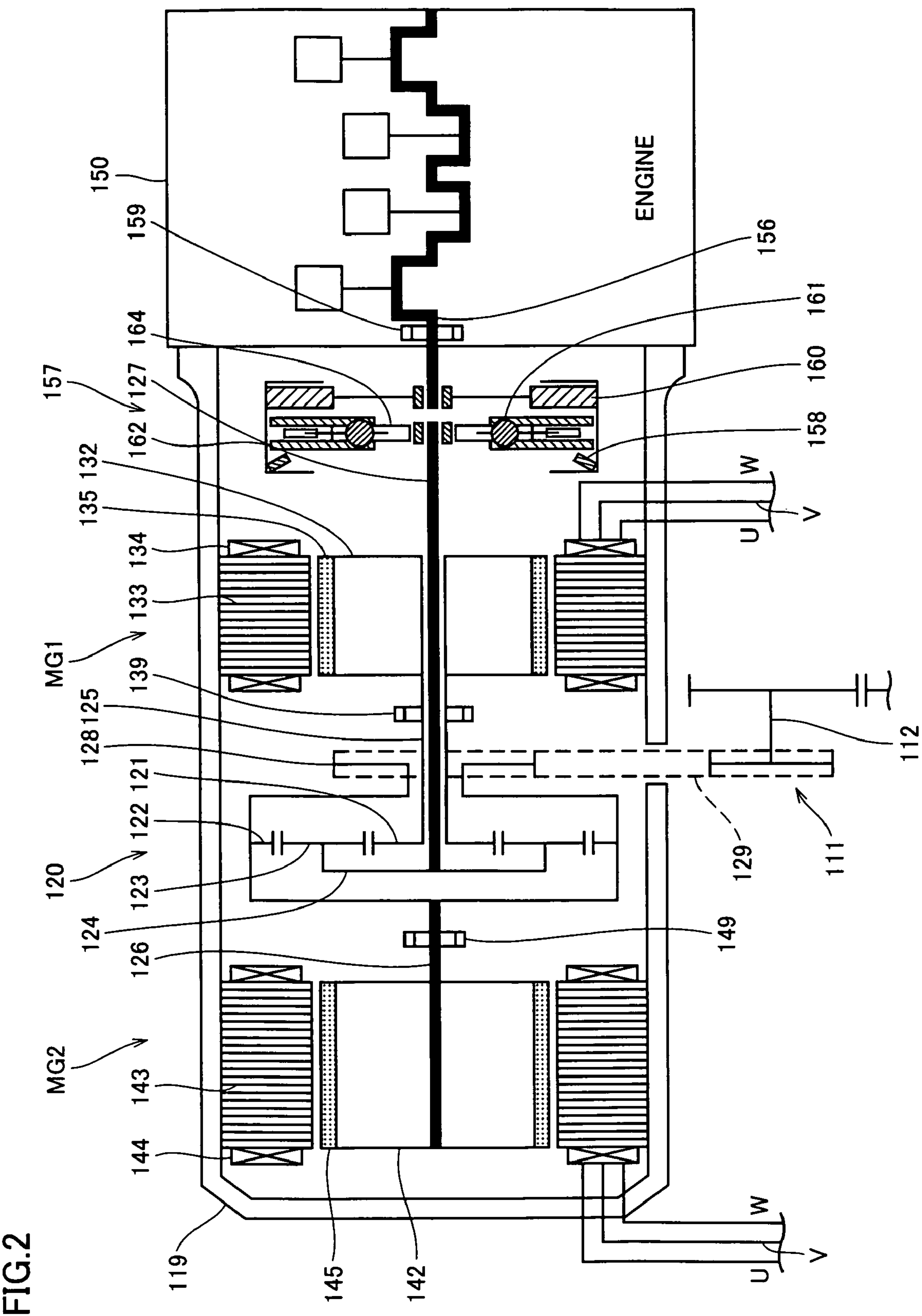
FIG. 2 is an enlarged view of a planetary gear shown in FIG. 1 and an engine and motor generators both connected to the planetary gear.

FIG. 2 is an enlarged view of planetary gear 120 shown in FIG. 1 and engine 150 and motor generators MG1 and MG2 both connected to planetary gear 120.

With reference to FIG. 2, planetary gear 120 is formed by a sun gear 121 connected to a hollow sun gear shaft 125 whose shaft center is penetrated by a carrier shaft 127, a ring gear 122 connected to a ring gear shaft 126 coaxial to carrier shaft 127, a plurality of planetary pinion gears 123 arranged between sun gear 121 and ring gear 122 for revolving round an outer periphery of sun gear 121 while rotating on their shafts, and a planetary carrier 124 connected to an end of carrier shaft 127 for axially supporting the rotation shafts of planetary pinion gears 123.

In planetary gear 120, three shafts of sun gear shaft 125, ring gear shaft 126 and carrier shaft 127 connected to sun gear 121, ring gear 122 and planetary carrier 124 respectively are input and output shafts of the motive power. When the motive power to be input from or output to any two shafts among the three is determined, the motive power to be input from or output to the remaining shaft is decided based on the determined motive power to be input from or output to the two shafts. Carrier shaft 127 forms an "input shaft" receiving the motive power from engine 150.

It should be noted that sun gear shaft 125 and ring gear shaft 126 are respectively provided with resolvers 139 and 149 for detecting their rotation angles θs and θr respectively.

Ring gear 122 is connected to motive power take-off gear 128 for taking the motive power off. This motive power take-off gear 128 is combined with motive power transmission gear 111 by chain belt 129. The motive power is transmitted between motive power take-off gear 128 and motive power transmission gear 111.

Motor generator MG1 is formed as a synchronous motor generator and provided with a rotor 132 having a plurality of permanent magnets 135 on an outer peripheral surface and a stator 133 wound by three-phase coil 134 forming a rotating magnetic field.

Rotor 132 is connected to sun gear shaft 125 connected to sun gear 121 of planetary gear 120. Stator 133 is formed by laminating a thin plate of a non-directional magnetic steel sheet and fixed to a case 119. This motor generator MG1 operates as an electric motor for rotationally driving rotor 132 by an mutual action of a magnetic field generated by permanent magnets 135 and a magnetic field generated by three-phase coil 134 and operates as a power generator for generating electromotive force at both ends of three-phase coil 134 by an mutual action of the magnetic field generated by permanent magnets 135 and rotation of rotor 132.

Motor generator MG2 is provided with a rotor 142 having a plurality of permanent magnets 145 on an outer peripheral surface and a stator 143 wound by three-phase coil 144 forming the rotating magnetic field. Rotor 142 is connected to ring gear shaft 126 connected to ring gear 122 of planetary gear 120, and stator 143 is fixed to case 119. This motor generator MG2 also operates as the electric motor or the power generator as well as motor generator MG1.

Engine 150 is a gasoline engine of a direct injection type for directly injecting fuel (such as gasoline fuel) into a cylinder. Crankshaft 156 is provided with an engine speed sensor (crank angle sensor) 159 for detecting rotation speed of the engine. Engine speed sensor 159 detects a rotation angle θe of crankshaft 156 and outputs to control unit 180 (FIG. 1). It should be noted that engine 150 is not limited to this but may be a gasoline engine of a port injection type.

With reference to FIG. 1 again, control unit 180 receives rotation angle θs of sun gear shaft 125 from resolver 139, rotation angle θr of ring gear shaft 126 from resolver 149, rotation angle θe of crankshaft 156 from engine speed sensor 159, an accelerator pedal position AP from an accelerator pedal position sensor 164*a*, a brake pedal position BP from a brake pedal position sensor 165*a*, a shift position SP from a shift position sensor 185, a motor current MCRT1 from a current sensor (not shown) attached to motor generator MG1, and a motor current MCRT2 from a current sensor (not shown) attached to motor generator MG2.

Based on these various input signals, control unit 180 controls a current supplied to three-phase coils 134 and 144 of motor generators MG1 and MG2 and drives motor generators MG1 and MG2.

Control unit 180 also forms the "abnormality detection apparatus for the internal combustion engine" for detecting an abnormality of engine 150. Based on rotation angle θs of sun gear shaft 125, rotation angle θr of ring gear shaft 126 and rotation angle θe of crankshaft 156, control unit 180 estimates engine torque by a method described later, and also detects the abnormality of engine 150 based on the estimated engine torque.

(Configuration of Damper 157)

Figure 3:
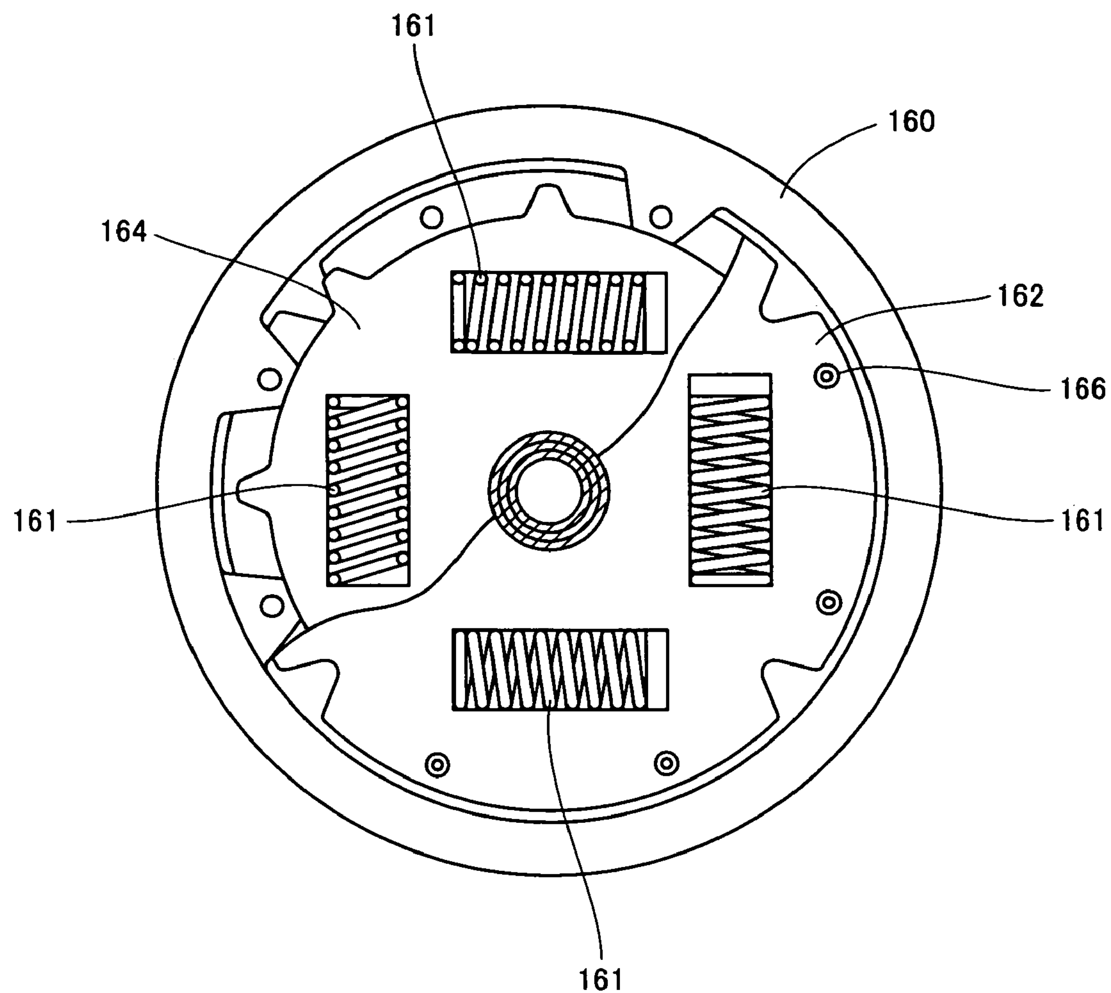
FIG. 3 is a partially cutout plan view of a damper shown in FIG. 2.

Crankshaft 156 of engine 150 is coupled with carrier shaft 127 of planetary gear 120 via damper 157. FIG. 3 is a partially cutout plan view of damper 157 shown in FIG. 2. Damper 157 forms a torque change absorption mechanism for suppressing the torsional oscillation from crankshaft 156 as described below.

With reference to FIGS. 2 and 3, damper 157 includes a drive side wheel 160 coupled with crankshaft 156 of engine 150 for rotationally driving together with crankshaft 156, a driven side wheel 164 arranged coaxial with drive side wheel 160 so as to be relatively rotated and coupled with carrier shaft 127, and an intermediate member 162 arranged so as to be relatively rotated within a predetermined angle range to drive side wheel 160 and driven side wheel 164 respectively.

Further, damper 157 includes torsion members 161 serving as elastic members arranged in windows of driven side wheel 164 and intermediate member 162 for elastically contracting in the circumferential direction so as to suppress change torque between drive side wheel 160 and driven side wheel 164, and a torque limiter 158 shutting transmission of the motive power from drive side wheel 160 to driven side wheel 164 when the change torque between drive side wheel 160 and driven side wheel 164 reaches a predetermined value.

An action of damper 157 formed in such a way will be described. When only engine 150 is driven, drive side wheel 160 is rotated together with the drive of engine 150. At this time, in a case where the change torque generated by inertia of engine 150 is smaller than a predetermined value, rotation torque is transmitted to intermediate member 162 via torque limiter 158, and intermediate member 162 is rotated. The rotation torque of intermediate member 162 is transmitted to driven side wheel 164 via torsion member 161, and driven side wheel 164 is rotated while torsion member 161 elastically contracts in accordance with the change torque. In such a way, the drive of engine 150 is transmitted to carrier shaft 127 via damper 157.

When drive torque of engine 150 is increased from the above state and the change torque between drive side wheel 160 and driven side wheel 164 reaches the predetermined value, a friction material in torque limiter 158 starts sliding, and the change torque of the predetermined value or more is not transmitted between intermediate member 162 and driven side wheel 164.

In such a way, since torsion member 161 and torque limiter 158 suppress relative rotation of drive side wheel 160 and driven side wheel 164, damper 157 transmits the change torque generated by a plurality of power sources (engine 150 and motor generators MG1 and MG2) while suppressing the change torque.

Meanwhile, since crankshaft 156 and carrier shaft 127 are coupled via this damper 157, in motive power output apparatus 100, there is a problem that the abnormality of engine 150 cannot be precisely detected in a case where the conventional cylinder abnormality detection apparatus to be applied to the motive power output apparatus having only the engine as the power source.

That is, as mentioned above, the conventional cylinder abnormality detection apparatus is formed so as to detect the abnormality of the engine based on the rotation angular speed of the crankshaft. In the motive power output apparatus having only the engine as the power source, the actual engine torque can be easily estimated by multiplying the rotation angular acceleration of the crankshaft calculated from a detected value of the crank angle sensor arranged in the crankshaft by inertia of the engine.

However, in motive power output apparatus 100 of the hybrid vehicle as shown in FIG. 1, the rotation state of crankshaft 156 is largely influenced by the rotation state of motor generators MG1 and MG2 via damper 157. That is, the rotation state of motor generators MG1 and MG2 acts as the elastic force of damper 157 on crankshaft 156 in the rotational direction. Therefore, there is inevitably a distinction between estimated engine torque obtained by multiplying the rotation angular acceleration of crankshaft 156 by the inertia of the engine and the actual engine torque. Consequently, when the abnormality of the engine is detected based on the estimated engine torque, accuracy in detecting the abnormality is not easily ensured.

Therefore, in motive power output apparatus 100 according to the present embodiment, the engine torque estimating unit is formed so as to estimate the engine torque with using the rotation angular acceleration of crankshaft 156 calculated from a detected value of engine speed sensor 159, and to correct the estimated engine torque with a correction term of the elastic force of damper 157 calculated based on the torsional angle of damper 157.

With such a configuration, even in a case where the rotation state of crankshaft 156 is varied due to a change in the rotation state of motor generators MG1 and MG2, by quantifying the influence by motor generators MG1 and MG2 as the elastic force generated in damper 157, this can be eliminated from the rotation state of crankshaft 156. As a result, since only a change in the rotation state of engine 150 generated in accordance with a real combustion state can be detected, it is possible to precisely detect the abnormality of the engine 150.

Hereinafter, an estimation method of engine torque according to the present embodiment will be described in detail. The estimation of the engine torque according to the present embodiment is performed by calculating the torsional angle of damper 157, correcting the calculated damper torsional angle by a zero point, and estimating the engine torque with using the correction term calculated based on the damper torsional angle after zero point correction.

[1] Calculation of Damper Torsional Angle

Firstly, a method for calculating the torsional angle of damper 157 will be described with reference to FIGS. 4 and 5A to 5D. As mentioned below, the damper torsional angle is calculated by calculating a rotation angle of carrier shaft 127, and determining a difference between the calculated rotation angle of carrier shaft 127 and a rotation angle of crankshaft 156 from engine speed sensor 159.

Figure 4:
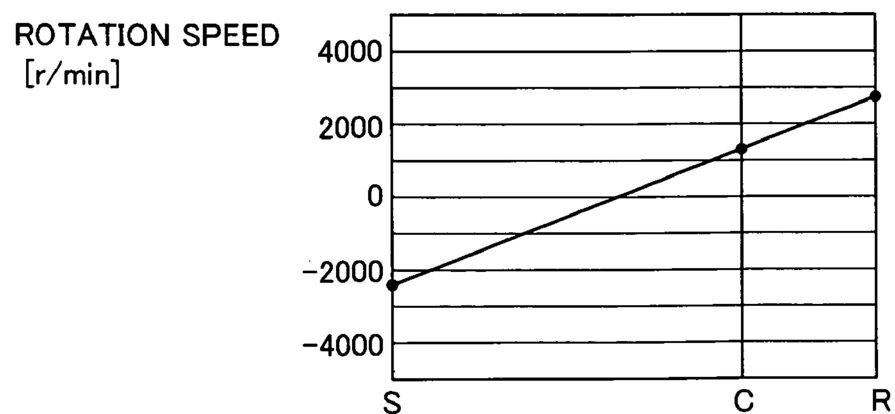
FIG. 4 is a graph showing an example of a collinear graph of a hybrid vehicle.

FIG. 4 shows an example of a collinear graph of the hybrid vehicle. With reference to FIG. 4, a vertical axis shows the rotation speed of each rotation shaft, and a horizontal axis shows a gear ratio of each gear by a distance relationship.

Sun gear shaft 125 (S in the figure) and ring gear shaft 126 (R in the figure) are placed on both ends, and carrier shaft 127 is placed at a position C created by dividing a distance between the position S and the position R by a ratio of 1:ρ. The term ρ is a ratio of the teeth number of sun gear 121 to the teeth number of ring gear 122.

The rotation speed of the rotation shafts of the gears is plotted on the positions S, C and R defined as above. Planetary gear 120 has a property where the three points plotted as above are always arranged on the same straight line. It should be noted that this straight line is called an action collinear line inevitably determined when two points are determined. Therefore, with using the action collinear line, the rotation speed of the remaining rotation shaft can be determined from the rotation speed of two rotation shafts.

Figure 5A:
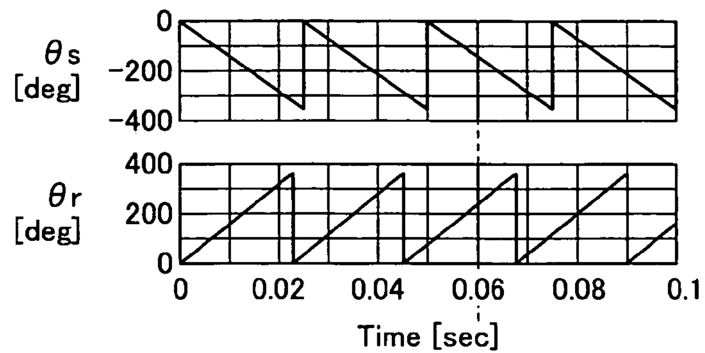
FIGS. 5A to 5D are graphs for describing calculating unit calculating a damper torsional angle when an operation state of the motive power output apparatus is represented by the collinear graph shown in FIG. 4.

FIG. 5A is a timing chart of rotation angles θs and θr of motor generators MG1 and MG2 when the operation state of motive power output apparatus 100 is represented by the collinear graph shown in FIG. 4. It should be noted that rotation angles θs and θr are signals output from resolvers 139 and 149 (FIG. 1).

Figure 5B:
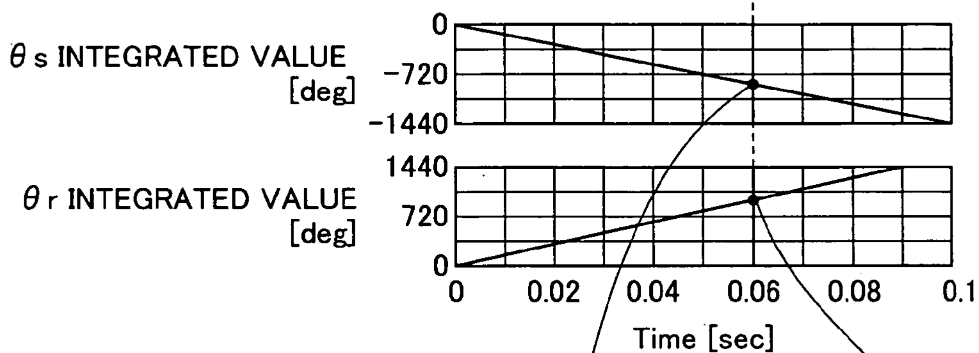

Integrated values where rotation angles θs and θr in FIG. 5A are respectively integrated are represented as in FIG. 5B. It can be found that sun gear shaft 125 and ring gear shaft 126 are rotated in the opposite direction to each other taking the time t=0 sec as a starting point.

Here, as mentioned above, by utilizing the fact that the rotation speed of these two shafts and carrier shaft 127 are aligned on the action collinear line, an integrated value of a rotation angle θc of the remaining carrier shaft 127 can be determined from the integrated values of rotation angles θs and θr of the two shafts.

Figure 5C:
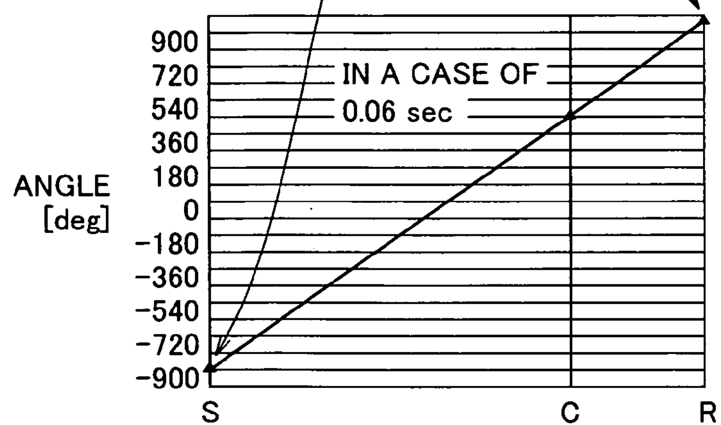

In detail, as shown in FIG. 5C, provided that rotation angle θs of sun gear shaft 125 and rotation angle θr of ring gear shaft 126 at the time t=0.06 sec are plotted on the position S and the position R respectively, and the integrated value of rotation angle θs and the integrated value of rotation angle θr are connected by a straight line. At this time, the rotation angle at the position C on the straight line is the integrated value of rotation angle θc of carrier shaft 127. Then, by dividing this integrated value of rotation angle θc by 360°, rotation angle θc is obtained.

In such a way, rotation angle θc of carrier shaft 127 is calculated based on rotation angle θs of sun gear shaft 125, rotation angle θr of ring gear shaft 126 and the gear ratio of both the shafts. The calculated rotation angle θc is a waveform as shown by a line LN1 in FIG. 5D.

Figure 5D:
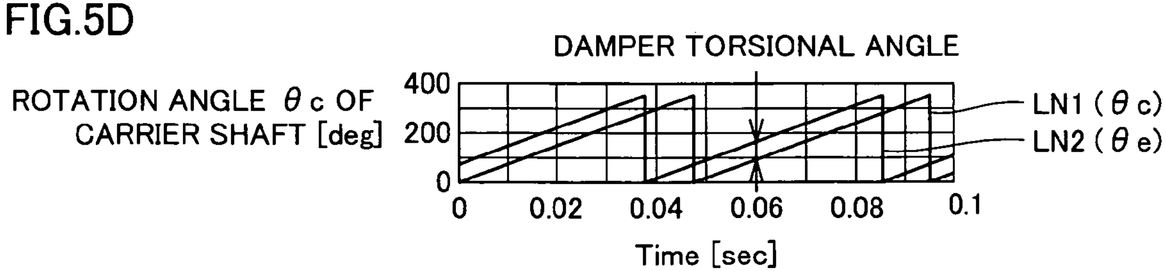

Meanwhile, rotation angle θe of the crankshaft detected by engine speed sensor 159 provided in crankshaft 156 of engine 150 is represented by a line LN2 in FIG. 5D.

Finally, by calculating the difference between rotation angle θc of carrier shaft 127 and rotation angle θe of crankshaft 156 at an arbitrary time (such as t=0.06 sec) with comparing this line LN1 with line LN2, a torsional angle θd (=θe−θc) of damper 157 can be determined.

[2] Zero Point Correction of Damper Torsional Angle

Next, with reference to FIGS. 6 and 7A to 7C, a method for correcting the damper torsional angle θd calculated in [1] by a zero point. This zero point correction is performed for removing a distinction in a relative angle generated between crankshaft 156 and carrier shaft 127, in a case where the drive torque of engine 150 is increased and torque limiter 158 of damper 157 operates.

Specifically, the zero point correction is performed by calculating a zero point correction value of the damper torsional angle with the following method, and offsetting the damper torsional angle θd with using the calculated zero point correction value.

The zero point correction value of the damper torsional angle is determined as a relative angle of crankshaft 156 and carrier shaft 127 when engine 150 is in an unloaded operation state where the engine torque is regarded as substantially zero.

Figure 6:
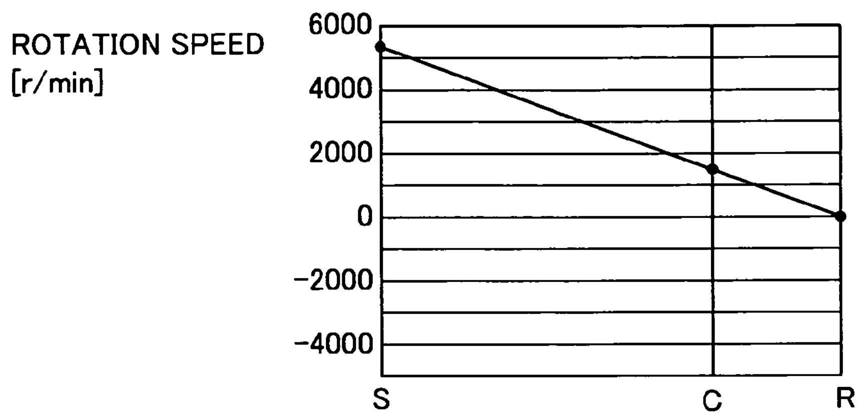
FIG. 6 is a collinear graph of a case where the engine is in an unloaded operation state.

FIG. 6 is a collinear graph in a case where engine 150 is in the unloaded operation state. The unloaded operation includes an idling operation performed in accordance with a demand for warming the engine for example.

The relative angle of carrier shaft 127 and crankshaft 156 at this time is, following the same process as shown in [1], determined by calculating rotation angle θc of carrier shaft 127 based on rotation angle θs of sun gear shaft 125, rotation angle θr of ring gear shaft 126 and the gear ratio of both the shafts, and calculating the difference between the calculated rotation angle θc and rotation angle θe of the crankshaft from engine speed sensor 159.

Figure 7A:
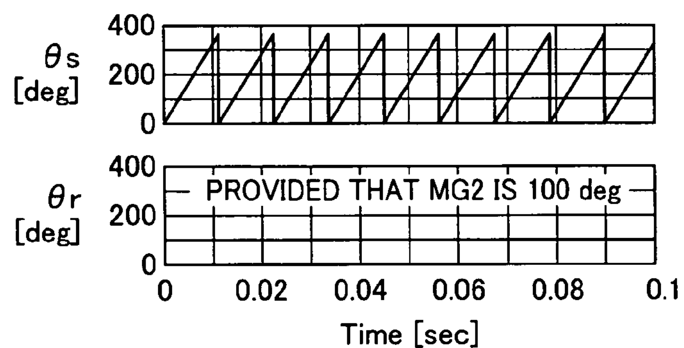
FIGS. 7A to 7C are graphs for describing calculating unit calculating a zero point correction value of the damper torsional angle when the operation state of the motive power output apparatus is represented by the collinear graph shown in FIG. 4.

In detail, FIG. 7A is a timing chart of rotation angles θs and θr of motor generators MG1 and MG2 when the operation state of motive power output apparatus 100 is represented by the collinear graph shown in FIG. 6. It should be noted that rotation angles θs and θr are the signals output from resolvers 139 and 149 (FIG. 1).

Figure 7B:
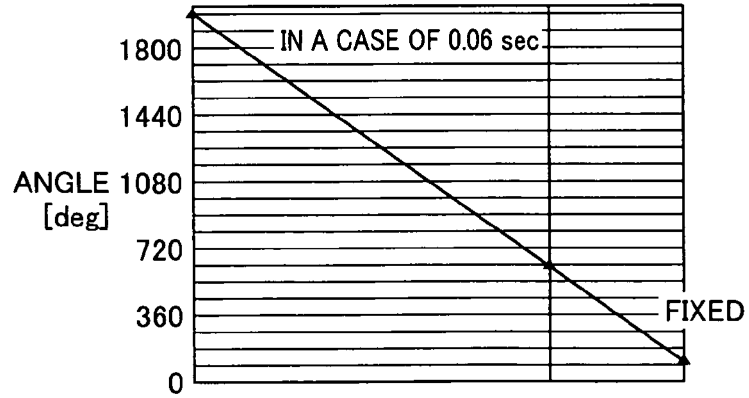

Integrated values where these rotation angles θs and θr are respectively integrated are calculated. By respectively plotting the integrated values at an arbitrary time (such as t=0.06 sec) on the position S and the position R as shown in FIG. 7B, an integrated value of rotation angle θc at the position C can be determined.

Figure 7C:
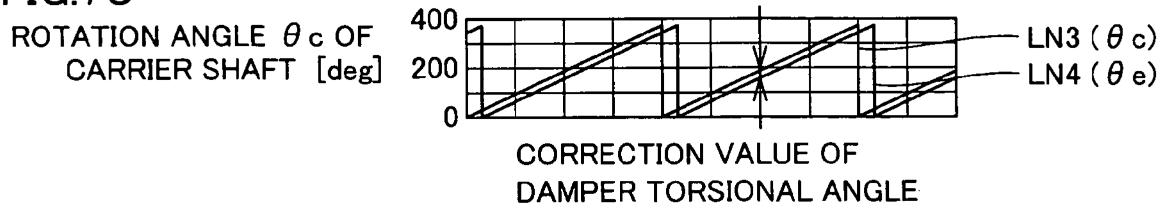

Further, by calculating the difference between rotation angle θc of carrier shaft 127 represented by a line LN3 in FIG. 7C and rotation angle θe of crankshaft 156 represented by a line LN4, the relative angle of carrier shaft 127 and crankshaft 156 is obtained. This relative angle is a zero point correction value θd0 of damper torsional angle θd.

$$\theta d0 = \theta c - \theta e \quad (1)$$

Zero point correction value θd0 of the damper torsional angle calculated by the expression (1) is stored in a memory area inside control unit 180 (FIG. 1), and read out and used from the memory area when the correction of damper torsional angle θd is performed. It should be noted that zero point correction value θd0 is calculated for every time when engine 150 is in the unloaded operation state. A zero point correction value in the memory area is updated to the calculated zero point correction value θd0.

Then, by performing the correction of offsetting damper torsional angle θd determined in [1] by zero point correction value θd0, a damper torsional angle θdi can be obtained.

$$\theta di = \theta d - \theta d0 \quad (2)$$

Here, it is determined whether or not damper torsional angle θdi obtained by the expression (2) is suitable for the correction value. Specifically, it is determined whether or not damper torsional angle θdi is within a predetermined angle range preliminarily set based on the elastic force of damper 157 or the like. In a case where damper torsional angle θdi is within the angle range, it is determined that damper torsional angle θdi is suitable for the correction value and hence used for estimating the engine torque described later.

Meanwhile, in a case where damper torsional angle θdi is out of the angle range, it is determined that damper torsional angle θdi is not suitable for the correction value, and zero point correction value θd0 of damper torsional angle θd is calculated again.

[3] Estimation of Engine Torque

Finally, means for calculating the correction term with using damper torsional angle θdi obtained in [2] and correcting the estimated engine torque with the calculated correction term will be described.

Engine torque Te can be normally estimated by multiplying rotation angular acceleration dωe/dt of crankshaft 156 by inertia Ie of the engine.

$$Te = Ie \cdot d\omega e/dt \quad (3)$$

Here, as mentioned above, since crankshaft 156 is connected to carrier shaft 127 via damper 157 in motive power output apparatus 100 according to the present embodiment, there is the influence of the rotation state of motor generators MG1 and MG2. Therefore, there is a distinction between the estimated torque obtained by the expression (3) and the actual torque. Particularly, in a case where the torque change of engine 150 is large and torque limiter 158 operates, this distinction is increased.

Therefore, in the present embodiment, as shown in the following expression, the engine torque is corrected by adding the elastic force generated in damper 157 to estimated engine torque Te calculated by the expression (3) as the correction term.

$$TE = Te + Tf + K\text{damp} \cdot \theta di \quad (4)$$

Where, Tf is friction torque, and Kdamp is a spring constant of torsion member 161 of damper 157.

It should be noted that friction torque Tf in the second term of the right member in the expression (4) is torque generated by motive friction of each of fitting parts such as friction between a piston and an inner wall of the cylinder. Specifically, a two-dimensional map regulating a relationship among the rotation speed of engine 150, cooling water temperature and intake pressure is preliminarily prepared by an experiment or the like. By referring to the map, friction torque Tf corresponding to the operation state of engine 150 at that time is determined.

Figure 8:
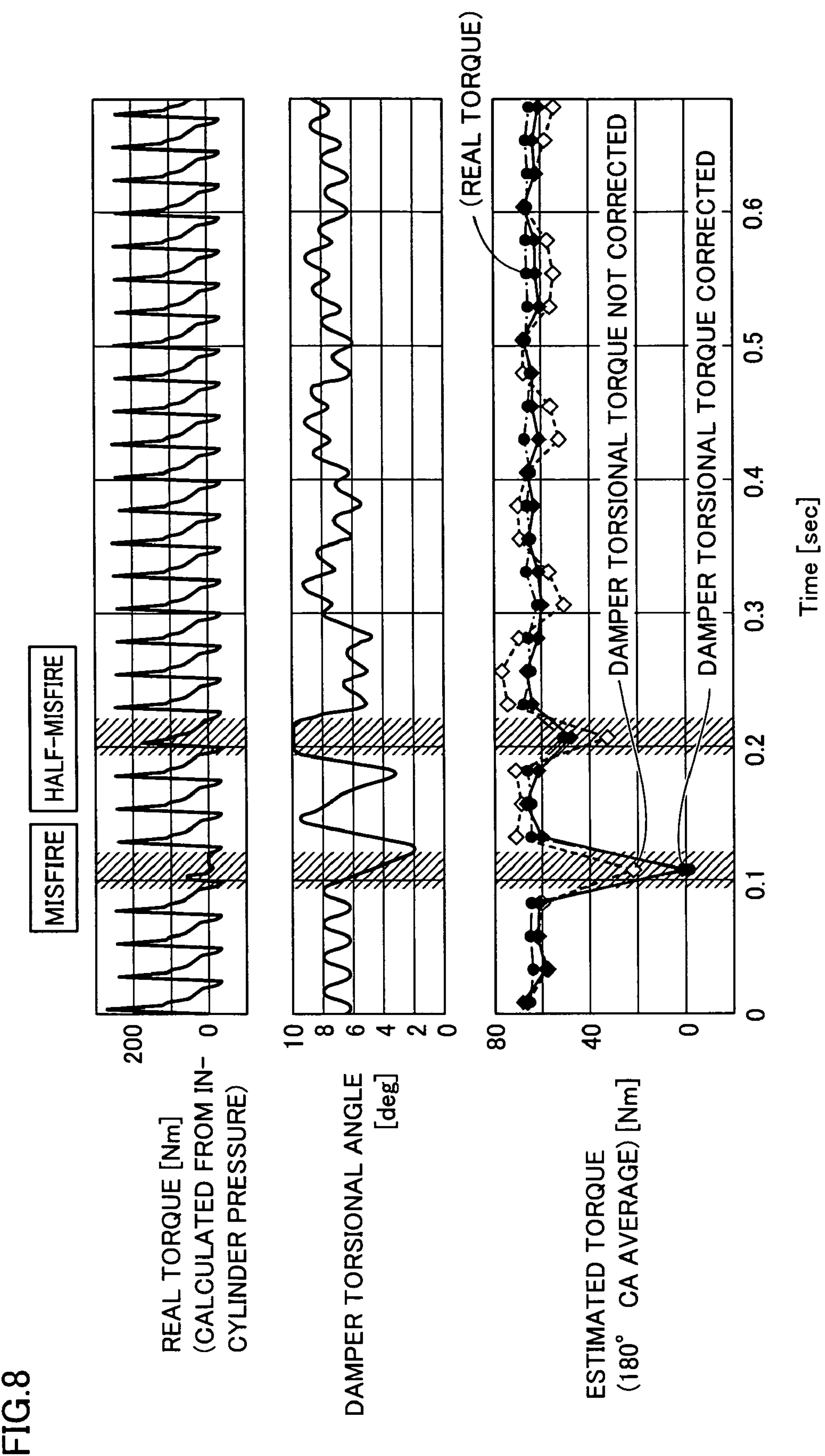
FIG. 8 is a graph for describing a result that engine torque estimated by the engine torque estimating unit according to the embodiment of the present invention is compared with actual engine torque calculated from in-cylinder pressure of the engine.

FIG. 8 is a graph for describing a result that the engine torque estimated by the engine torque estimating unit according to the present embodiment is compared with the actual engine torque calculated from in-cylinder pressure of the engine.

With reference to FIG. 8, an upper part of the figure shows the actual torque (real torque) calculated based on the in-cylinder pressure of engine 150 detected by a in-cylinder pressure sensor and rotation angle θe of crankshaft 156 from engine speed sensor 159. A middle part of the figure shows damper torsional angle θdi calculated following the processes of [1] and [2].

Further, a lower part of the figure shows the real torque (average value) obtained by averaging the real torque on the upper part within a section where rotation angle θe is 180°, estimated torque Te obtained by multiplying rotation angular acceleration dωe/dt of crankshaft 156 by inertia Ie of engine 150, and an estimated torque TE determined by correcting the above estimated torque Te with the correction term based on damper torsional angle θdi following the processes of [1] and [2].

By comparing the upper part with the middle part of FIG. 8, it is found that in a case where engine 150 is in a misfire state and in a half-misfire state, damper torsional angle θdi is radically changed.

When estimated torque Te is compared with estimated torque TE with focusing on the lower part of FIG. 8, it is found that a deviation from the real torque (average value) is smaller in estimated torque TE than in estimated torque Te.

Particularly, around the time t=0.1 sec when the misfire is caused in engine 150 and the real torque is lowered down to substantially zero, estimated torque Te is differed from the real torque by approximately 20 Nm, while estimated torque TE corrected based on damper torsional angle θdi is substantially zero and corresponds to the real torque. Similarly, around the time t=0.2 sec when the half-misfire is caused in engine 150, estimated torque TE also precisely corresponds to the real torque.

As mentioned above, according to the engine torque estimating unit of the present embodiment, the influence of motor generators MG1 and MG2 can be eliminated from the rotation state of engine 150. Therefore, output torque of engine 150 generated in accordance with the combustion state can be estimated with high accuracy. As a result, it is possible to precisely detect the abnormality of engine 150.

It should be noted that the rotation state of engine 150 is influenced not only by the rotation state of motor generators MG1 and MG2 but also by a state of a traveling road of the vehicle (such as an uneven state of a road surface). However, according to the present embodiment, by taking a rotation change of drive shaft 112 as the elastic force generated in damper 157, this can be eliminated from the rotation state of crankshaft 156. Therefore, in this case as well, since only the change in the rotation state of engine 150 based on the real combustion state can be detected, it is possible to precisely detect the abnormality of engine 150.

Further, according to the engine torque estimating unit of the present embodiment, the change in the rotation state of engine 150 can be detected based on the estimated output torque of engine 150, it is possible to stabilize the combustion state by feeding the detected change in the rotation state of engine 150 back to fuel injection control and ignition timing control.

It should be noted that when the engine torque is estimated for every cylinder, a deviation of the engine torque between the cylinders can be extracted. Therefore, it is also possible to individually perform the fuel injection control and the ignition timing control for a plurality of cylinders.

Figure 9:
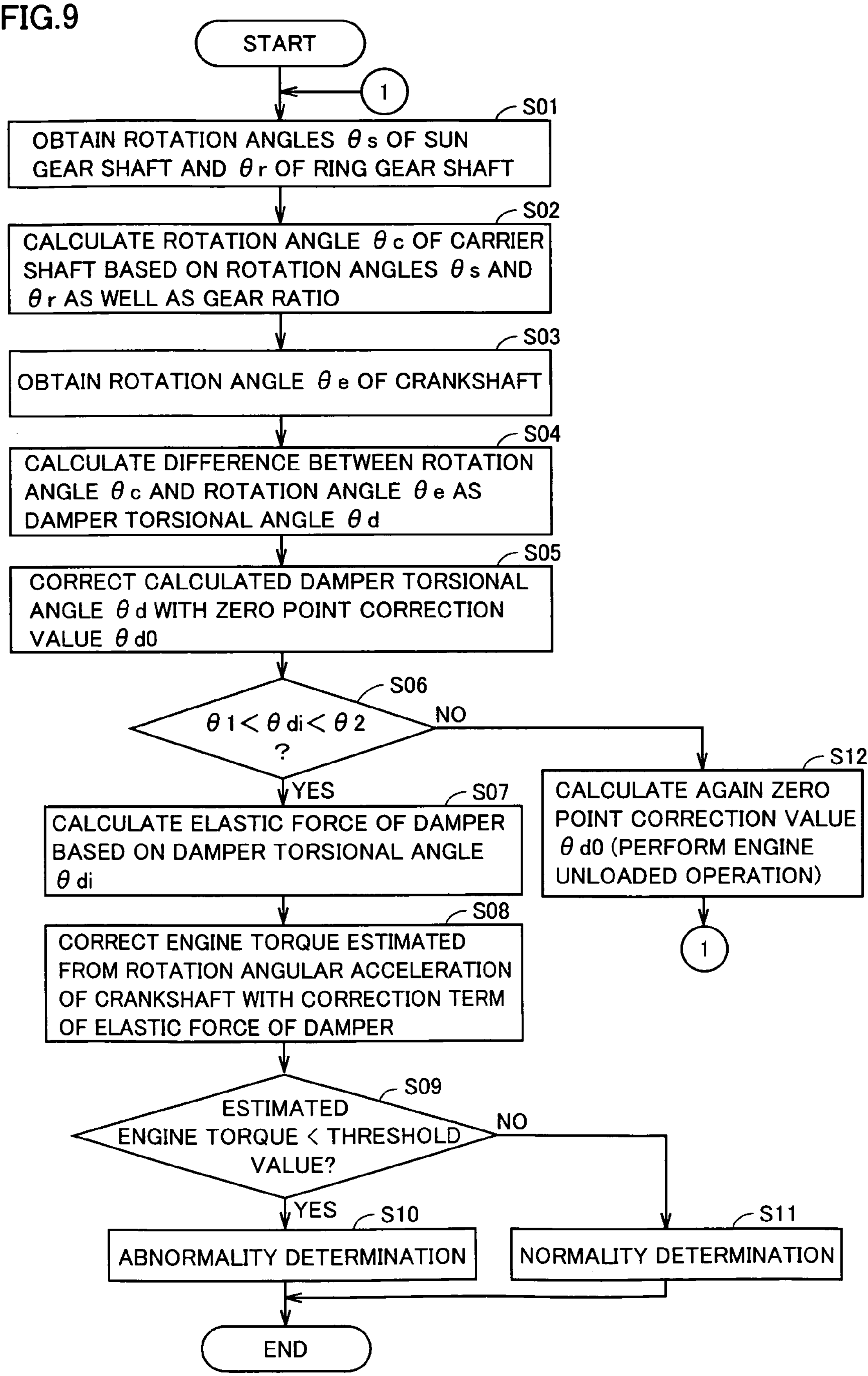
FIG. 9 is a flowchart for describing an operation of detecting an abnormality of the engine according to the embodiment of the present invention.

FIG. 9 is a flowchart for describing an operation of detecting the abnormality of engine 150 according to the present embodiment.

With reference to FIG. 9, when a series of operations are started, control unit 180 obtains rotation angles θs and θr of sun gear shaft 125 and ring gear shaft 126 respectively based on the signals output from resolvers 139 and 149 FIG. 1) (Step S01). Then, control unit 180 calculates rotation angle θc of carrier shaft 127 based on the obtained rotation angles θs and θr of the two shafts and the gear ratio of both the shafts (Step S02).

Next, control unit 180 obtains rotation angle θe of the crankshaft from engine speed sensor 159 (FIG. 2) (Step S03). Then, control unit 180 calculated torsional angle θd (=θe−θc) of damper 157 by calculating the difference between rotation angle θc of carrier shaft 127 and rotation angle θe of crankshaft 156 (Step S04).

Control unit 180 further reads out zero point correction value θd0 from the memory area, and performs the correction of offsetting damper torsional angle θd calculated in Step S04 by zero point correction value θd0 (Step S05). At this time, control unit 180 determines whether or not damper torsional angle θdi after correction is within a predetermined angle range preliminarily set (Step S06). In a case where damper torsional angle θdi is within the predetermined angle range, control unit 180 determines that damper torsional angle θdi is suitable for the correction value, and brings the processing forward to Step S07.

Meanwhile, in a case where damper torsional angle θdi is out of the predetermined angle range, control unit 180 makes engine 150 in the unloaded operation state, and calculates zero point correction value θd0 again (Step S12). Then, control unit 180 updates a zero point correction value Δθd stored in the memory area to calculated zero point correction value θd0, and brings the processing back to Step S01.

In Step S07, control unit 180 calculates the elastic force generated in damper 157 based on damper torsional angle θdi. Then, control unit 180 corrects engine torque Te by adding the elastic force generated in damper 157 to engine torque Te estimated from rotation angular acceleration dωe/dt of crankshaft 156 as the correction term (Step S08).

Finally, control unit 180 determines whether or not estimated engine torque TE after correction is smaller than a predetermined threshold value (Step S09). In a case where estimated engine torque TE after correction is smaller than the predetermined threshold value, control unit 180 determines that the abnormality with the misfire is caused in engine 150 (Step S10). Meanwhile, in a case where estimated engine torque TE after correction is not smaller than the predetermined threshold value, control unit 180 determines that engine 150 normally works (Step S11).

It should be noted that the detection of the abnormality of engine 150 by control unit 180 is actually executed by a CPU (Central Processing Unit). The CPU reads out a program provided with each of Steps shown in FIG. 9 from a ROM (Read Only Memory), and executes each of Steps shown in FIG. 9 so as to determine the abnormality of engine 150.

Therefore, the ROM corresponds to a computer (CPU) readable medium storing a program causing a computer (CPU) to execute control for detecting the abnormality of engine 150.

Modified Example

Hereinafter, a modified example according to the embodiment of the present invention will be described. Estimation of the engine torque according to the present modified example is different from the preceding embodiment for estimating an absolute amount of the engine torque in terms of a point that a variation amount in the engine torque in a predetermined interval between samplings is estimated. Other configurations are the same as the embodiment mentioned above. Therefore, the detailed description for those configurations will not be repeated.

In detail, the estimation of the variation amount in the engine torque according to the present modified example is performed by calculating a relative angle Δθd of the torsional angle of damper 157 in the predetermined interval between samplings, and estimating the variation amount in the engine torque in the interval between samplings with using the correction term calculated based on the calculated relative angle Δθd of the torsional angle.

Firstly, with reference to FIG. 10, a method for calculating the relative angle of the torsional angle of damper 157 will be described.

Figure 10:
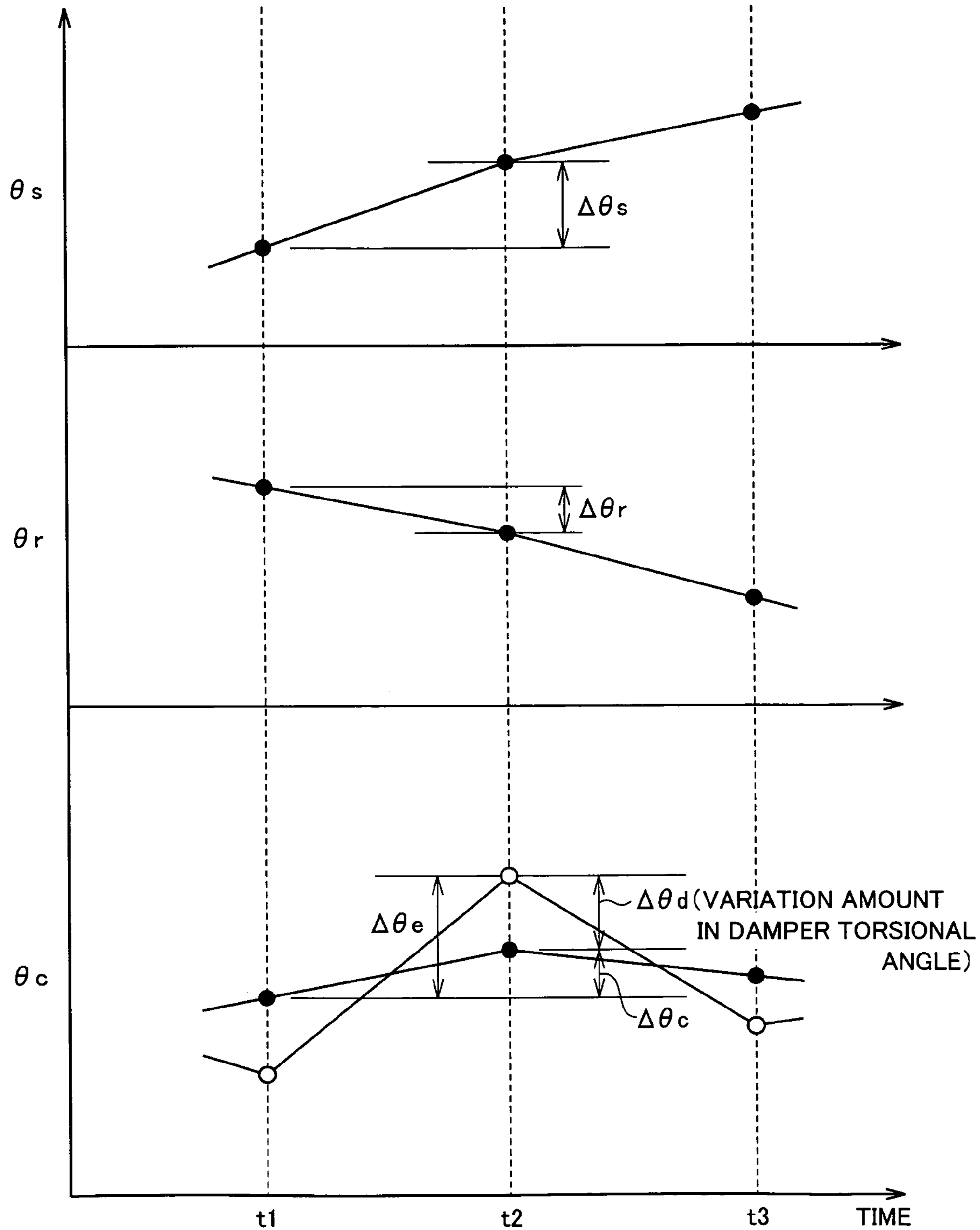
FIG. 10 is a timing chart of rotation angles of a sun gear shaft and a ring gear shaft.

FIG. 10 is a timing chart of rotation angle θs of sun gear shaft 125 and rotation angle θr of ring gear shaft 126. It should be noted that rotation angles θs and θr are signals detected in the predetermined interval between samplings and output from resolvers 139 and 149 (FIG. 1).

With reference to FIG. 10, rotation angle θs of sun gear shaft 125 at the time t2 is increased by a variation amount Δθs from a detected value at the time t1 serving as previous sampling timing. Rotation angle θr of ring gear shaft 126 at the time t2 is decreased by a variation amount Δθr from a detected value at the time t1 serving as the previous sampling timing.

Here, as mentioned above, at each sampling timing, rotation angle θs of sun gear shaft 125, rotation angle θr of ring gear shaft 126 and rotation angle θc of carrier shaft 127 are aligned on the action collinear line. Therefore, a variation amount Δθc in rotation angle θc of carrier shaft 127 in the interval between samplings can be determined based on variation amounts Δθs and Δθr in the rotation angles of sun gear shaft 125 and ring gear shaft 126 in the interval between samplings (=t2−t1) and the gear ratio of both the shafts.

Meanwhile, rotation angle θe of crankshaft 156 is detected by engine speed sensor 159 provided in crankshaft 156 of engine 150 in the predetermined interval between samplings.

Therefore, by calculating a difference between variation amount Δθc in the rotation angle of carrier shaft 127 and a variation amount Δθe in the rotation angle of crankshaft 156 in an arbitrary interval between samplings, relative angle Δθd of the torsional angle of damper 157 in the interval between samplings (=Δθc−Δθe) can be determined.

Then, a variation amount in the elastic force generated in damper 157 is calculated by multiplying the obtained relative angle Δθd of the torsional angle by spring constant Kdamp of torsion member 161. A variation amount ΔTe in the engine torque in an interval between samplings is calculated by calculating a difference between engine torque Te estimated from the rotation angular speed of crankshaft 156 at this sampling timing t2 and engine torque Te estimated at the previous sampling timing t1.

Finally, variation amount ΔTe in the engine torque is corrected by adding the variation amount in the elastic force generated in damper 157 to the calculated variation amount ΔTe in the engine torque in the interval between samplings as the correction term. Based on a determination result on whether or not a variation amount ΔTE in the engine torque after correction is within a predetermined range preliminarily set, the abnormality of engine 150 is determined.

In such a way, in the present modified example, with the correction term based on relative angle Δθd of the torsional angle of damper 157 in an arbitrary interval between samplings, the variation amount in the engine torque in the interval between samplings is corrected. Therefore, there is no need for a processing of correcting the damper torsional angle by a zero point as mentioned in the above embodiment. As a result, it is possible to more easily determine the abnormality of engine 150.

FIG. 11 is a flowchart for describing an operation of detecting the abnormality of engine 150 according to the present modified example.

With reference to FIG. 11, when a series of operations are started, control unit 180 obtains rotation angles θs and θr of sun gear shaft 125 and ring gear shaft 126 respectively based on the signals output from resolvers 139 and 149 performing samplings on a predetermined sampling cycle (FIG. 1) (Step S21). Then, control unit 180 respectively calculates variation amounts Δθs and Δθr from the detected values at the previous sampling timing with regard to the obtained rotation angles θs and θr of the two shafts (Step S22).

Next, control unit 180 calculates variation amount Δθc in the rotation angle of carrier shaft 127 based on the calculated variation amounts Δθs and Δθr in the rotation angles of the two shafts and the gear ratio of both the shafts (Step S23).

Further, after obtaining rotation angle θe of crankshaft 156 from engine speed sensor 159 (FIG. 2), control unit 180 calculates variation amount Δθe from the detected value at the previous sampling timing (Step S24). Then, control unit 180 calculates relative angle Δθd (=Δθe−Δθc) of the torsional angle of damper 157 in the interval between samplings by calculating the difference between variation amount Δθc in the rotation angle of carrier shaft 127 and variation amount Δθe in the rotation angle of crankshaft 156 (Step S25).

At this time, control unit 180 determines whether or not relative angle Δθd of the damper torsional angle is within a predetermined angle range preliminarily set (Step S26). In a case where relative angle Δθd of the damper torsional angle is within the predetermined angle range, control unit 180 determines that relative angle Δθd of the damper torsional angle is suitable, and brings the processing forward to Step S27.

Meanwhile, in a case where relative angle Δθd of the damper torsional angle is out of the predetermined angle range, control unit 180 determines that torque limiter 158 of damper 157 operates, and brings the processing back to Step S21.

In Step S27, control unit 180 calculates the variation amount in the elastic force generated in damper 157 based on relative angle Δθd of the damper torsional angle. Then, control unit 180 calculates variation amount ΔTe from engine torque Te at the previous sampling timing with regard to engine torque Te estimated from rotation angular acceleration dωe/dt of crankshaft 156, and corrects the variation amount in engine torque Te by adding the variation amount in the elastic force generated in damper 157 to the calculated variation amount ΔTe in the engine torque as the correction term (Step S28).

Finally, control unit 180 determines whether or not variation amount ΔTE in the estimated engine torque after correction is within a predetermined range (Step S29). In a case where variation amount ΔTE in the estimated engine torque is within the predetermined range, control unit 180 determines that engine 150 normally works (Step S30). Meanwhile, in a case where variation amount ΔTE in the estimated engine torque is out of the predetermined range, control unit 180 determines that the abnormality with the misfire is caused in engine 150 (Step S31).

It should be noted that the detection of the abnormality of engine 150 by control unit 180 is actually executed by the CPU (Central Processing Unit). The CPU reads out a program provided with each of Steps shown in FIG. 11 from the ROM (Read Only Memory), and executes each of Steps shown in FIG. 11 so as to determine the abnormality of engine 150.

Therefore, the ROM corresponds to a computer (CPU) readable medium storing a program causing a computer (CPU) to execute control for detecting the abnormality of engine 150.

It should be noted that various configurations including the configuration shown in FIG. 1 can be adapted as the configuration of the hybrid vehicle to be applied to the present invention. In FIG. 1, although motor generator MG2 is also connected to ring gear shaft 126, the present invention can be applied to a configuration where motor generator MG2 is not connected. Motor generator MG2 may be not connected to ring gear shaft 126 but directly connected to crankshaft 156 of engine 150. Since the rotation state of engine 150 is influenced by variation amount in the rotation state of the motor generator, the present invention can be also applied to such a configuration.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An abnormality detection apparatus for detecting an abnormality of an internal combustion engine in a motive power output apparatus for outputting motive power to a drive shaft by utilizing said internal combustion engine and a motor generator as power sources, said motive power output apparatus including:

a power split device configured to mechanically connect an input shaft receiving the motive power from said internal combustion engine, a rotation shaft of said motor generator and said drive shaft, and also to mechanically split the motive power from said internal combustion engine to said motor generator and said drive shaft; and a damper connected between an output shaft of said internal combustion engine and said input shaft for transferring the motive power while suppressing relative rotation of the output shaft of said internal combustion engine and said input shaft, said abnormality detection apparatus comprising:

a torque estimating unit estimating output torque of said internal combustion engine based on rotation angular acceleration of the output shaft of said internal combustion engine;

a torque correcting unit calculating elastic force to be imposed on the output shaft of said internal combustion engine so that said damper suppresses the relative rotation of the output shaft of said internal combustion engine and said input shaft, and to correct said estimated output torque of said internal combustion engine based on the calculated elastic force of said damper; and an abnormality diagnosing unit diagnosing the abnormality of said internal combustion engine based on the corrected output torque of said internal combustion engine.

2. The abnormality detection apparatus according to claim 1, wherein said damper includes an elastic member compressed when the output shaft of said internal combustion engine and said input shaft are relatively rotated so as to impose the elastic force on both the shafts, and said torque correcting unit includes:

a torsional angle obtaining unit obtaining a torsional angle of the output shaft of said internal combustion engine and said input shaft; and an elastic force calculating unit calculating the elastic force of said damper by multiplying said obtained torsional angle by an elastic constant of said elastic member.

3. The abnormality detection apparatus according to claim 2, wherein said power split device includes a planetary gear which has at least three gear elements, coupled with the rotation shaft of said motor generator, said drive shaft and said input shaft respectively, said torsional angle obtaining unit includes:

an input shaft rotation angle calculating unit calculating a rotation angle of said input shaft based on rotation angles of the rotation shaft of said motor generator and said drive shaft and a gear ratio of said gear elements;

an output shaft rotation angle detecting unit detecting a rotation angle of the output shaft of said internal combustion engine; and a torsional angle calculating unit calculating a difference between the detected rotation angle of the output shaft of said internal combustion engine and the rotation angle of said input shaft as the torsional angle of the output shaft of said internal combustion engine and said input shaft.

4. The abnormality detection apparatus according to claim 3, wherein said torsional angle obtaining unit further includes a zero point correcting unit correcting the calculated difference between the rotation angle of the output shaft of said internal combustion engine and the rotation angle of said input shaft by taking the torsional angle of the output shaft of said internal combustion engine and said input shaft in an operation state that the output torque of said internal combustion engine is substantially zero as a zero point.

5. The abnormality detection apparatus according to claim 2, wherein said power split device includes a planetary gear which has at least three gear elements, coupled with the rotation shaft of said motor generator, said drive shaft and said input shaft respectively, said torsional angle obtaining unit includes:

a rotation angle variation amount calculating unit obtaining the rotation angles of the rotation shaft of said motor generator and said drive shaft on a predetermined sampling cycle and calculating variation amounts in the rotation angles of the rotation shaft of said motor generator and said drive shaft in an interval between samplings;

an input shaft rotation angle variation amount calculating unit calculating a variation amount in the rotation angle of said input shaft in the interval between samplings based on the variation amounts in the rotation angles of the rotation shaft of said motor generator and said drive shaft and a gear ratio of said gear elements;

an output shaft rotation angle variation amount calculating unit calculating a variation amount in the rotation angle of the output shaft of said internal combustion engine in the interval between samplings; and a torsional angle variation amount calculating unit calculating a difference between the calculated variation amount in the rotation angle of the output shaft of said internal combustion engine and the variation amount in the rotation angle of said input shaft as a variation amount in the torsional angle of the output shaft of said internal combustion engine and said input shaft, said elastic force calculating unit calculates a variation amount in the elastic force of said damper by multiplying the obtained variation amount of said torsional angle by an elastic constant of said elastic member, said torque correcting unit corrects the variation amount in the output torque of said internal combustion engine in the interval between samplings based on the calculated variation amount in the elastic force of said damper, and said abnormality diagnosing unit diagnoses the abnormality of said internal combustion engine based on the corrected variation amount in the output torque of said internal combustion engine.

6. An abnormality detection method for detecting an abnormality of an internal combustion engine in a motive power output apparatus for outputting motive power to a drive shaft by utilizing said internal combustion engine and a motor generator as power sources, said motive power output apparatus including:

a power split device configured to mechanically connect an input shaft receiving the motive power from said internal combustion engine, a rotation shaft of said motor generator and said drive shaft, and also to mechanically split the motive power from said internal combustion engine to said motor generator and said drive shaft; and a damper connected between an output shaft of said internal combustion engine and said input shaft for transferring the motive power while suppressing relative rotation of the output shaft of said internal combustion engine and said input shaft, said abnormality detection method comprising the steps of:

estimating output torque of said internal combustion engine based on rotation angular acceleration of the output shaft of said internal combustion engine;

calculating elastic force to be imposed on the output shaft of said internal combustion engine so that said damper suppresses the relative rotation of the output shaft of said internal combustion engine and said input shaft, and correcting said estimated output torque of said internal combustion engine based on the calculated elastic force of said damper; and diagnosing the abnormality of said internal combustion engine based on the corrected output torque of said internal combustion engine.

7. The abnormality detection method according to claim 6, wherein said damper includes an elastic member compressed when the output shaft of said internal combustion engine and said input shaft are relatively rotated so as to impose the elastic force on both the shafts, and said step of correcting the output torque includes the steps of:

obtaining a torsional angle of the output shaft of said internal combustion engine and said input shaft; and calculating the elastic force of said damper by multiplying said obtained torsional angle by an elastic constant of said elastic member.

8. The abnormality detection method according to claim 7, wherein said power split device includes a planetary gear which has at least three gear elements, coupled with the rotation shaft of said motor generator, said drive shaft and said input shaft respectively, said step of obtaining the torsional angle includes the steps of:

calculating a rotation angle of said input shaft based on rotation angles of the rotation shaft of said motor generator and said drive shaft and a gear ratio of said gear elements;

detecting a rotation angle of the output shaft of said internal combustion engine; and calculating a difference between the detected rotation angle of the output shaft of said internal combustion engine and the rotation angle of said input shaft as the torsional angle of the output shaft of said internal combustion engine and said input shaft.

9. The abnormality detection method according to claim 8, wherein said step of obtaining the torsional angle further includes the step of correcting the calculated difference between the rotation angle of the output shaft of said internal combustion engine and the rotation angle of said input shaft by taking the torsional angle of the output shaft of said internal combustion engine and said input shaft in an operation state that the output torque of said internal combustion engine is substantially zero as a zero point.

10. The abnormality detection method according to claim 7, wherein said power split device includes a planetary gear which has at least three gear elements, coupled with the rotation shaft of said motor generator, said drive shaft and said input shaft respectively, said step of obtaining the torsional angle includes the steps of:

obtaining the rotation angles of the rotation shaft of said motor generator and said drive shaft on a predetermined sampling cycle and calculating variation amounts in the rotation angles of the rotation shaft of said motor generator and said drive shaft in an interval between samplings;

calculating a variation amount in the rotation angle of said input shaft based on the variation amounts in the rotation angles of the rotation shaft of said motor generator and said drive shaft and a gear ratio of said gear elements;

calculating a variation amount in the rotation angle of the output shaft of said internal combustion engine in the interval between samplings; and calculating a difference between the calculated variation amount in the rotation angle of the output shaft of said internal combustion engine and the variation amount in the rotation angle of said input shaft as a variation amount in the torsional angle of the output shaft of said internal combustion engine and said input shaft, said step of calculating the elastic force is to calculate a variation amount in the elastic force of said damper by multiplying the obtained variation amount of said torsional angle by an elastic constant of said elastic member, said step of correcting the output torque is to correct the variation amount in the output torque of said internal combustion engine in the interval between samplings based on the calculated variation amount in the elastic force of said damper, and said step of detecting the abnormality is to diagnose the abnormality of said internal combustion engine based on the corrected variation amount in the output torque of said internal combustion engine.

* * * * *